Jan. 1, 1957  G. M. BAIGENT  2,776,037
FEEDER AND/OR CONVEYOR MECHANISMS
Filed July 14, 1952  2 Sheets-Sheet 2
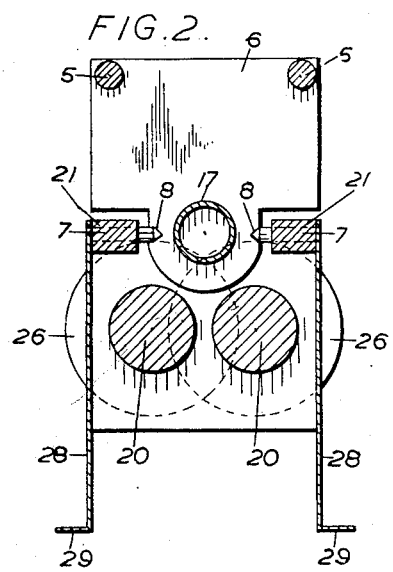
Inventor
George Matley Baigent
By Wenderoth, Lind + Ponack
Attorneys

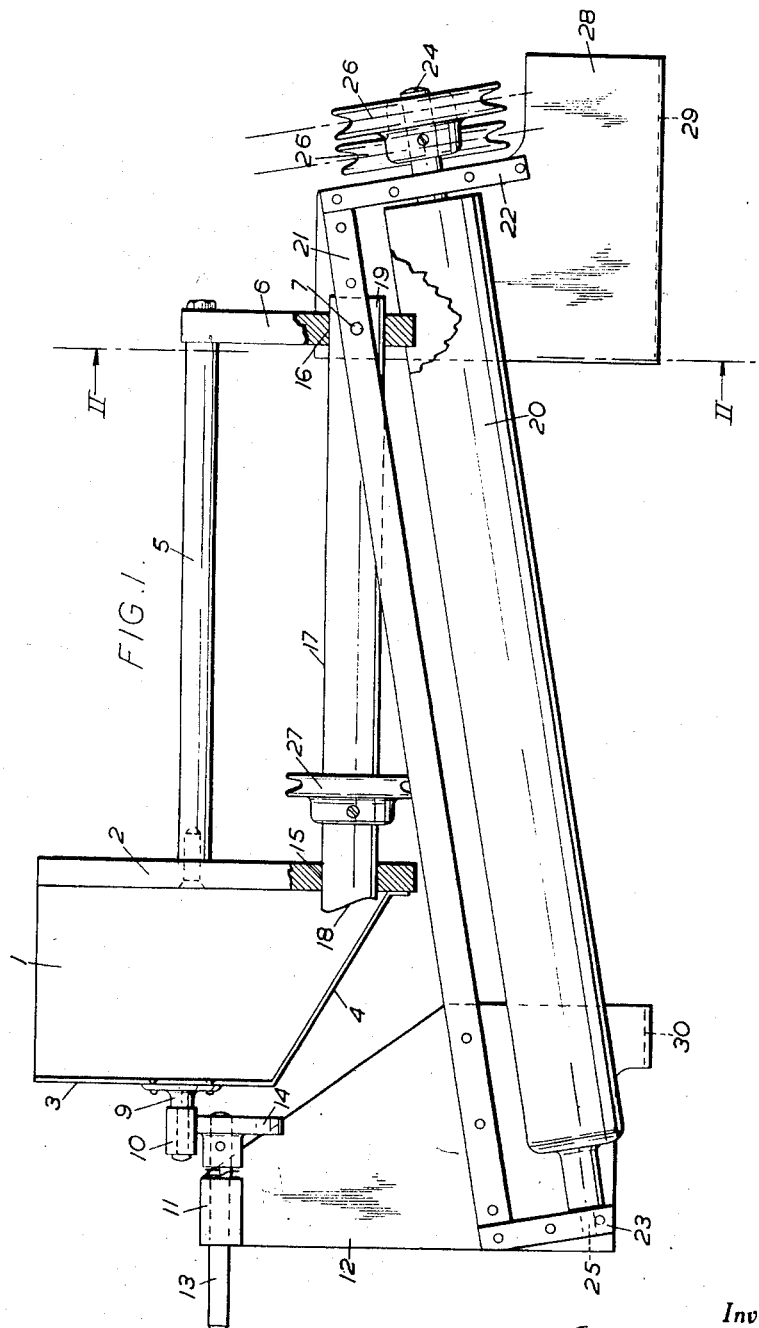

United States Patent Office 2,776,037
Patented Jan. 1, 1957

2,776,037

FEEDER AND/OR CONVEYOR MECHANISMS

George Mattey Baigent, Bourne End, England

Application July 14, 1952, Serial No. 298,725

4 Claims. (Cl. 198—30)

This invention is for improvements in or relating to feeder and/or conveyor mechanisms and has for an object to provide a construction which will facilitate the feeding of articles of uniform or non-uniform size and/or shape one by one, for example, to a delivery point. The invention can be applied to a very wide variety of uses, amongst which may be mentioned the feeding of peas, whether dried or otherwise, for counting or sorting and discarding defective articles.

According to the present invention, there is provided a feeder and/or conveyor mechanism, for the feeding of articles one by one, comprising two inclined rollers which are each rotatably mounted and means for rotating said rollers, continuously or intermittently, preferably in opposite directions of rotation. Due to the rotation of the rollers, the articles which are supplied to the input end of the rollers are caused to be in a continual state of agitation as they move along the length thereof and, as a result of this agitation, they settle down into a stream of articles moving in line along the length of the rollers to the delivery ends thereof from which they are discharged one by one.

If the articles are allowed to fall freely from the delivery ends of the rollers, they will be found to fall in a stream with a gap between each article which will progressively increase with the distance between the point at which the gap is observed and the point of discharge from the rollers; the gap between the falling articles is moreover, adjustable by variation of the speed and/or nature of the surfaces of the rollers as well as by variation of the angle of slope of the rollers; the shape of the delivery ends of the rollers may be varied to suit different articles.

A feature of the invention consists in that said two rollers are so disposed that the gap between them on a line joining their centres increases progressively from the input ends to the delivery ends thereof. With this arrangement, the mechanism can also serve as a classifying device.

It will be appreciated that the rollers may be disposed so as to be inclined downwardly from the input end to the delivery end. With substantially spherical articles, however, there is a danger that they may roll along downwardly inclined rollers at different speeds which will lead to irregularity in the discharge of the articles and therefore it may be desirable to dispose the rollers so that they are upwardly inclined and to effect the feeding of the articles along the rollers under the influence of the horizontal component of pressure caused by feeding the articles vertically on the input ends of the rollers by gravity.

It will be appreciated that the rollers may be rotated at the same or different speeds. The ends of the rollers at the delivery end may be sharp or they may be shaped, e. g. rounded off, as may be found most suitable for the size and/or nature of the articles being fed thereto.

The following is a description of one specific embodiment of the invention, reference being made to the accompanying drawings in which:

Figure 1 shows a side elevation in part section of the feeder mechanism.

Figure 2 is a cross-sectional view taken along the line II—II of Figure 1.

Referring to Figure 1, the feeder mechanism comprises a hopper generally indicated as having side walls 1, a front wall 2, a rear wall 3 and a sloping bottom 4. The hopper is supported by means of two rods 5 which are secured to the front wall 2 of the hopper at one end and to a vertical supporting plate 6 at the other end. The vertical plate 6 is pivoted on the supporting girders carrying the rollers by means of pins 7 engaging with recesses 8 formed in the plate 6.

To the rear wall 3 of the hopper there is secured a spindle 9 upon which is mounted a roller 10 which engages with a cam member whereby the hopper may be moved pivotally about the pins 7.

The eccentric is carried in a bearing 11 mounted upon side plates 12 and comprises a shaft carried in the bearing 11 carrying at its end the cam 14. It will readily be seen that rotation of the shaft 13 turns the cam and thereby raises the hopper about the pivot pins 7.

Close to the lower edge of the front wall 2 of the hopper there is formed a hole 15 and a corresponding coaxial hole 16 is formed in the supporting plate 6. In these two holes 15 and 16 there is mounted a tube 17, the end 18 of which protrudes into the hopper which, as indicated in the drawing, is cut off obliquely so that on rotation the articles in the hopper are agitated and are also subjected to a scooping motion whereby they are caused to enter the tube 17.

The other end 19 of the tube 17 protrudes through the supporting plate 6 and is disposed centrally over the pair of rollers which are now described.

The main feeding action of the feeder mechanism is dependent upon the rotation of a pair of rollers 20 which, as seen in Figure 2, are spaced apart by a suitable distance so that the articles fed from the tube 17 through the end 19 on to the two rollers do not fall between the two rollers 20.

The rollers are carried by two girders 21 in which, as above-mentioned, the pivot pins 7 are mounted, the girders 21 extending along the length of the feeder mechanism and are inclined in order that the rollers mounted thereon shall themselves be inclined.

Secured to the ends of the girders 21 are two plates 22 and 23 at the top and bottom ends of the rollers respectively, the two plates 22 and 23 each being provided with holes in which spindles secured to the roller ends are carried. The rollers at their lower ends are provided with small shafts 25 to engage with the holes in the end plate 23.

At the upper ends of the rollers 20 the shafts 24 extend through the holes in the end plate 22 and mounted upon each shaft is a pulley wheel 26 whereby the two rollers may be rotated.

In order to rotate the tube 17 another pulley wheel 27 is mounted on the tube 17 and the three pulleys 26, 26 and 27 may conveniently be driven from a single motor shaft which is not shown in the drawings.

To mount and support the feeder mechanism two pairs of side plates are provided. At the front, i. e. the lower or delivery end of the rollers the girders 21 and end plate 23 are secured to the side plate 12 previously mentioned, whilst at the upper end of the girders there is disposed another pair of side plates 28 to which the upper end of the girders and the end plate 22 are secured.

The side plates 12 and 28 are formed with outwardly disposed flanges at their lower edges as shown at 29 and 30 so that the feeder mechanism may be supported on slides.

The operation of the device is that the articles, for example dried peas, are placed in the hopper and the feeder tube 17 and the two rollers 20 are rotated by means of the pulleys 26 and 27. The angle of inclination of the tube 17 is adjusted by rotation of the cam 14 previously referred to so that the requisite number of articles are fed along the tube in unit time to provide for a constant flow of these articles from the lower ends of the rollers 20.

The rollers 20 are rotated in opposite directions so that their innermost surfaces are moving upwards, as a result of which articles fed into the space between the two rollers from the tube 17 are subjected to continuous agitation, as a result of which, during their travel down the inclined rollers 20, they settle down into a single line of articles following closely one after the other so as to be discharged from the lower end of the rollers 20 in a steady stream.

It will be noted that the lower end of the rollers are rounded off in the construction illustrated in Figure 1 but the rounded ends of the rollers are not essential to a successful operation of the feeder mechanism and the ends of the rollers may be square or may be more rounded than is illustrated in the drawings.

By varying the rate of rotation of the feeder tube 17 and by varying the rate of rotation of the rollers 20, the rate of feed of articles along the rollers may be controlled so as to achieve optimum efficiency of feed.

It will be appreciated that the rate of movement of the articles down the inclined rollers is to a certain extent dependent upon the inclination of the rollers and this angle may be arranged to be variable by pivotally mounting the supporting mechanism for the rollers comprising the girders 21 and end plates 22 and 23 on the end plates 12 or 28.

It will be appreciated that the constructions of the present invention can be adapted for the feeding of widely differing articles and are capable of adjustment to secure a wide range of control of the rate of feed of the articles.

What I claim is:

1. A feeder and conveying mechanism for articles comprising a hopper, a rotatably mounted straight downwardly inclined feeding tube having its upper end scoop shaped to agitate the articles in said hopper, said upper end being mounted in the lower end of said hopper and communicating with the interior thereof, two conveying rollers rotatably mounted side by side and spaced from one another thereby forming a channel for said articles, said rollers being mounted immediately below said feeding tube with said feeding tube located above said channel between said rollers, said rollers having their input end adjacent the lower end of said feeding tube to receive said articles fed therethrough, means for rotating said feeding tube, means for rotating said conveying rollers, said hopper and feeding tube being pivotally mounted at one end and means provided at the other end for varying the inclination thereof.

2. A feeder and conveying mechanism for articles as set forth in claim 1 wherein said conveying rollers are mounted downwardly inclined from the input end of said rollers.

3. A feeder and conveying mechanism for articles as set forth in claim 1, wherein said means for rotating said rollers rotate said rollers at the same speed in directions so that their surfaces adjacent said channel move upwardly.

4. A feeder and conveying mechanism for articles comprising a hopper, a rotatably mounted straight downwardly inclined feeding tube having its upper end scoop shaped to agitate the articles in said hopper, said upper end being mounted in the lower end of said hopper and communicating with the interior thereof, two conveying rollers rotatably mounted side by side and spaced from one another thereby forming a channel for said articles, said rollers being mounted immediately below said feeding tube with said feeding tube located above said channel between said rollers, said rollers having their input end adjacent the lower end of said feeding tube to receive said articles fed therethrough, means for rotating said feeding tube, means for rotating said conveying rollers, said hopper and feeding tube being pivotally mounted at one end and cam means provided at the other end for varying the inclination thereof.

References Cited in the file of this patent

UNITED STATES PATENTS

| Number | Name | Date |
|---|---|---|
| 141,328 | Cox et al. | July 29, 1873 |
| 580,742 | Vrooman | Apr. 13, 1897 |
| 873,268 | Raabe | Dec. 10, 1907 |
| 1,031,589 | Russell | July 2, 1912 |
| 1,191,403 | Crocker | July 18, 1916 |
| 1,342,220 | Lewis et al. | June 1, 1920 |
| 1,652,419 | Shields | Dec. 13, 1927 |
| 1,811,991 | Bates | June 30, 1931 |
| 1,851,820 | Dunbar | Mar. 29, 1932 |
| 2,062,854 | Yager et al. | Dec. 1, 1936 |
| 2,097,610 | Wilsey | Nov. 2, 1937 |
| 2,366,256 | Harris et al. | Jan. 2, 1945 |
| 2,403,862 | Lakso | July 9, 1946 |
| 2,515,404 | Grosvenor | July 18, 1950 |
| 2,592,275 | Grosvenor | Apr. 8, 1952 |
| 2,597,930 | Grosvenor | May 27, 1952 |
| 2,602,555 | Hutaff | July 8, 1952 |